United States Patent
Rao et al.

(10) Patent No.: US 7,626,846 B2
(45) Date of Patent: Dec. 1, 2009

(54) METHOD AND MEDIA FOR IMPROVING FERROELECTRIC DOMAIN STABILITY IN AN INFORMATION STORAGE DEVICE

(75) Inventors: Valluri Ramana Rao, Saratoga, CA (US); Li-Peng Wang, San Jose, CA (US); Qing Ma, San Jose, CA (US); Byong Man Kim, Fremont, CA (US)

(73) Assignee: Nanochip, Inc., Fremont, CA (US)

( * ) Notice: Subject to any disclaimer, the term of this patent is extended or adjusted under 35 U.S.C. 154(b) by 212 days.

(21) Appl. No.: 11/778,571

(22) Filed: Jul. 16, 2007

(65) Prior Publication Data

US 2009/0021975 A1 Jan. 22, 2009

(51) Int. Cl.
G11C 11/22 (2006.01)

(52) U.S. Cl. .................. 365/145; 369/126; 427/100; 977/947

(58) Field of Classification Search .......... 365/145, 365/151; 369/126; 427/100; 977/947
See application file for complete search history.

(56) References Cited

U.S. PATENT DOCUMENTS

| | | | | |
|---|---|---|---|---|
| 3,783,825 A | 1/1974 | Kobayashi et al. | ........... | 118/422 |
| 4,736,424 A | 4/1988 | Busby | ........... | 380/50 |
| 5,155,658 A | 10/1992 | Inam et al. | ........... | 361/321 |
| 5,216,631 A | 6/1993 | Sliwa, Jr. | ........... | 365/174 |
| 5,229,986 A | 7/1993 | Mizokami et al. | ........... | 369/59 |
| 5,307,311 A | 4/1994 | Sliwa, Jr. | ........... | 365/174 |
| 5,335,098 A | 8/1994 | Leyva et al. | ........... | 359/7 |
| 5,341,328 A | 8/1994 | Ovshinsky et al. | ........... | 365/163 |
| 5,398,229 A | 3/1995 | Nakayama et al. | ........... | 369/126 |
| 5,440,669 A | 8/1995 | Rakuljic et al. | ........... | 359/7 |
| 5,488,602 A | 1/1996 | Yamano et al. | ........... | 369/126 |
| 5,491,570 A | 2/1996 | Rakuljic et al. | ........... | 359/7 |
| 5,684,611 A | 11/1997 | Rakuljic et al. | ........... | 359/7 |

(Continued)

FOREIGN PATENT DOCUMENTS

EP 1 530 210 5/2005

(Continued)

OTHER PUBLICATIONS

Lee, et al., "Built-in voltages and asymmetric polarization switching in Pb(Zr, Ti)O3 thin film capacitors," Applied Physics Letters, vol. 72, No. 25, Jun. 22, 1998, pp. 3380-3382.

(Continued)

*Primary Examiner*—Tuan T Nguyen
*Assistant Examiner*—Alexander Sofocleous
(74) *Attorney, Agent, or Firm*—Fliesler Meyer LLP

(57) ABSTRACT

A media for an information storage device includes a substrate of single-crystal silicon, a buffer layer of an epitaxial single crystal insulator formed over the substrate, a bottom electrode layer of an epitaxial single crystal conductor formed over the buffer layer, a ferroelectric layer of an epitaxial single crystal ferroelectric material formed over the bottom electrode layer, and an overlayer of an epitaxial single crystal material formed over the ferroelectric layer. Dipole charges generally having a first orientation exist at an interface between the bottom electrode layer and the ferroelectric layer includes, while dipole charges generally having a second orientation opposite the first orientation exist at an interface between the ferroelectric layer and the overlayer includes.

16 Claims, 4 Drawing Sheets

U.S. PATENT DOCUMENTS

| | | | |
|---|---|---|---|
| 5,721,194 A | 2/1998 | Yandrofski et al. | 505/210 |
| 5,777,977 A | 7/1998 | Fujiwara et al. | 369/126 |
| 5,835,477 A | 11/1998 | Binnig et al. | 369/126 |
| 5,851,902 A | 12/1998 | Sakai et al. | 438/459 |
| 5,864,412 A | 1/1999 | Wilde | 359/7 |
| 5,886,922 A | 3/1999 | Saito et al. | 365/164 |
| 5,892,223 A | 4/1999 | Karpov et al. | 250/306 |
| 5,953,306 A | 9/1999 | Yi | 369/126 |
| 5,985,404 A | 11/1999 | Yano et al. | 428/65.3 |
| 6,064,587 A * | 5/2000 | Jo | 365/145 |
| 6,105,421 A | 8/2000 | Yao et al. | 73/105 |
| 6,121,648 A | 9/2000 | Evans | 257/295 |
| 6,194,228 B1 | 2/2001 | Fujiki et al. | 438/3 |
| 6,272,909 B1 | 8/2001 | Yao et al. | 73/105 |
| 6,356,524 B2 | 3/2002 | Aratani | 369/126 |
| 6,411,589 B1 | 6/2002 | Hoen et al. | 369/126 |
| 6,477,132 B1 | 11/2002 | Azuma et al. | 369/126 |
| 6,501,210 B1 | 12/2002 | Ueno et al. | 310/331 |
| 6,515,898 B2 | 2/2003 | Baumeister et al. | 365/174 |
| 6,515,957 B1 | 2/2003 | Newns | 360/55 |
| 6,521,921 B2 | 2/2003 | Lim et al. | 257/255 |
| 6,551,703 B1 | 4/2003 | Falcone et al. | 428/336 |
| 6,562,633 B2 * | 5/2003 | Misewich et al. | 438/3 |
| 6,587,408 B1 | 7/2003 | Jacobson et al. | 369/44 |
| 6,597,639 B1 | 7/2003 | Hamann | 369/14 |
| 6,611,033 B2 | 8/2003 | Hsu et al. | 257/414 |
| 6,663,989 B2 | 12/2003 | Lee et al. | 428/702 |
| 6,677,629 B1 | 1/2004 | Fischer et al. | 257/295 |
| 6,781,176 B2 | 8/2004 | Ramesh | 257/295 |
| 6,784,475 B2 | 8/2004 | Hong et al. | 257/295 |
| 6,819,588 B2 | 11/2004 | Baumeister et al. | 365/174 |
| 6,841,220 B2 | 1/2005 | Onoe | 428/66.7 |
| 6,854,648 B2 | 2/2005 | Hong et al. | 235/451 |
| 6,912,193 B2 | 6/2005 | Cho | 369/126 |
| 6,942,914 B2 | 9/2005 | Onoe | 428/701 |
| 6,977,839 B2 | 12/2005 | Sharma | 365/173 |
| 7,019,371 B2 | 3/2006 | Seigler | 257/425 |
| 7,026,676 B2 | 4/2006 | Ahner et al. | 257/295 |
| 7,027,364 B2 | 4/2006 | Hong et al. | 369/13.01 |
| 7,041,394 B2 | 5/2006 | Weller et al. | 428/836 |
| 7,065,033 B2 | 6/2006 | Onoe | 369/125 |
| 7,142,449 B2 | 11/2006 | Smith et al. | 365/171 |
| 7,149,180 B2 | 12/2006 | Onoe | 369/276 |
| 7,151,739 B2 | 12/2006 | Cho | 369/126 |
| 7,153,597 B2 | 12/2006 | Yang et al. | 428/836 |
| 7,171,512 B2 | 1/2007 | Sauerwein et al. | 711/100 |
| 7,180,847 B2 | 2/2007 | Binnig et al. | 369/126 |
| 7,185,440 B2 | 3/2007 | Gage et al. | 33/561 |
| 7,212,484 B2 | 5/2007 | Maeda | 369/101 |
| 7,218,600 B2 | 5/2007 | Cho | 369/126 |
| 7,221,639 B2 | 5/2007 | Onoe | 369/126 |
| 7,227,830 B2 | 7/2007 | Cho | 369/126 |
| 7,242,661 B2 | 7/2007 | Cho | 369/126 |
| 7,262,984 B2 | 8/2007 | Schindler et al. | 365/145 |
| 7,265,937 B1 | 9/2007 | Erden | 360/55 |
| 7,276,173 B2 | 10/2007 | Onoe | 523/466 |
| 7,283,453 B2 | 10/2007 | Onoe | 369/126 |
| 7,291,878 B2 | 11/2007 | Stipe | 257/296 |
| 7,307,875 B2 | 12/2007 | Johnson | 365/158 |
| 7,336,590 B2 | 2/2008 | Cho et al. | 369/126 |
| 7,339,819 B2 | 3/2008 | Johnson | 365/158 |
| 7,391,706 B2 * | 6/2008 | Nauka et al. | 369/126 |
| 7,396,692 B2 | 7/2008 | Windlass et al. | 438/3 |
| 7,397,398 B2 | 7/2008 | Jin et al. | 341/59 |
| 7,397,624 B2 | 7/2008 | Johns et al. | 360/75 |
| 7,420,774 B2 | 9/2008 | Sievers et al. | 360/97.02 |
| 2004/0027935 A1 | 2/2004 | Cho | |
| 2004/0042351 A1 | 3/2004 | Onoe | |
| 2004/0252621 A1 | 12/2004 | Cho | |
| 2004/0257887 A1 | 12/2004 | Binnig et al. | |
| 2005/0047288 A1 | 3/2005 | Maeda | |
| 2005/0052984 A1 | 3/2005 | Hong et al. | |
| 2005/0094430 A1 | 5/2005 | Nauka | |
| 2005/0095389 A1 | 5/2005 | Newns | |
| 2005/0099895 A1 | 5/2005 | Maeda | |
| 2005/0122886 A1 | 6/2005 | Takahashi | |
| 2005/0128616 A1 | 6/2005 | Johns et al. | |
| 2005/0128928 A1 | 6/2005 | Takahashi | |
| 2005/0147017 A1 | 7/2005 | Gibson | |
| 2005/0147018 A1 | 7/2005 | Kim et al. | |
| 2006/0023606 A1 | 2/2006 | Lutwyche | |
| 2006/0091437 A1 | 5/2006 | Hong et al. | |
| 2006/0182004 A1 | 8/2006 | Maeda | |
| 2006/0187803 A1 | 8/2006 | Baechtold | |
| 2006/0211154 A1 | 9/2006 | Buehlmann | |
| 2006/0219655 A1 | 10/2006 | Cho | |
| 2006/0245110 A1 | 11/2006 | Hanchi et al. | |
| 2006/0245312 A1 | 11/2006 | Maeda | |
| 2006/0252172 A1 | 11/2006 | Park et al. | |
| 2006/0256485 A1 | 11/2006 | Seigler et al. | |
| 2007/0014047 A1 | 1/2007 | Cho | |
| 2007/0030791 A1 | 2/2007 | Hasebe et al. | |
| 2007/0041233 A1 | 2/2007 | Roelofs | |
| 2007/0059564 A1 | 3/2007 | Klemmer et al. | |
| 2007/0152253 A1 | 7/2007 | Lee | |
| 2007/0158731 A1 | 7/2007 | Bae | |
| 2007/0180167 A1 | 8/2007 | Tan et al. | |
| 2007/0196618 A1 | 8/2007 | Nam et al. | |
| 2007/0210812 A1 | 9/2007 | Yoo | |
| 2007/0253314 A1 | 11/2007 | Jones | |
| 2007/0254383 A1 | 11/2007 | Buehlmann | |
| 2007/0296500 A1 | 12/2007 | Yang | |
| 2008/0002272 A1 | 1/2008 | Riedel | |
| 2008/0017609 A1 | 1/2008 | Takahashi | |
| 2008/0020489 A1 | 1/2008 | Im | |
| 2008/0024910 A1 | 1/2008 | Seigler | |
| 2008/0075980 A1 | 3/2008 | Ambrose et al. | |
| 2008/0089211 A1 | 4/2008 | Chu et al. | |
| 2008/0114981 A1 | 5/2008 | Hars | |
| 2008/0136692 A1 | 6/2008 | Lerdworatawee et al. | |
| 2008/0144452 A1 | 6/2008 | Ling et al. | |
| 2008/0148004 A1 | 6/2008 | Iren et al. | |
| 2008/0151597 A1 | 6/2008 | Kiely et al. | |
| 2008/0175033 A1 * | 7/2008 | Wang et al. | 365/145 |
| 2008/0175133 A1 | 7/2008 | Roelofs et al. | |
| 2008/0175136 A1 | 7/2008 | Liem et al. | |
| 2008/0187780 A1 | 8/2008 | Jones et al. | |
| 2008/0192528 A1 | 8/2008 | Siegert et al. | |
| 2008/0232228 A1 | 9/2008 | Adams et al. | |
| 2008/0316897 A1 | 12/2008 | Kim et al. | |
| 2008/0318086 A1 | 12/2008 | Kim et al. | |
| 2009/0168635 A1 * | 7/2009 | Tran et al. | 369/126 |

FOREIGN PATENT DOCUMENTS

| | | |
|---|---|---|
| EP | 1 542 222 | 6/2005 |
| EP | 1 662 499 | 5/2006 |
| JP | 5020675 | 1/1993 |
| WO | WO 97/05610 | 2/1997 |
| WO | WO 2004/105012 | 12/2004 |

OTHER PUBLICATIONS

Fu, et al., "Effect of built-in bias fields on the nanoscale switching in ferroelectric thin films," Applied Physics A-Materials Science and Processing, vol. 80, No. 5, 2005, pp. 1067-1070.

Fong, et al., "Stabilization of Monodomain Polarization in Ultrathin PbTiO3 Films," Physical Review Letters, vol. 96, No. 12, Mar. 31, 2006, pp. 127601.

Kalinin, S., "Nanoscale Electric Phenomena at Oxide Surfaces and Interfaces by Scanning Probe Microscopy," A Dissertation in the Materials Science and Engineering, University of Pennsylvania, 2002, 304 pages.

Wu, S., "Piezoresponse Force Microscopy," Application Note, Agilent Technologies, 2007, 4 pages.

L. Richard Carley, Gregory R. Ganger and David F. Nagle, Mems-Based Integrated-Circuit Mass-Storage Systems, Communications of the ACM, vol. 43, No. 11, Nov. 2000, pp. 73-80.

Rosei, Federico, "Nanostructured surfaces: Challenges and frontiers in nanotechnology," 2004 Journal of Physics: Condensed Matter, Apr. 16, 2004, pp. 1373-1436.

Honda, Koichiro, et al., "Visualization of electrons and holes localized in the thin gate film of metal-oxide-nitride-oxide-semiconductor type Flash memory by scanning nonlinear dielectric microscopy," Nanotechnology, Institute of Physics Publishing, 2005, pp. 590-593.

Eom, C.B., et al., "Fabrication and properties of epitaxial ferroelectric heterostructures with (SrRuO3) isotropic metallic oxide electrodes," Appl. Phys. Lett., vol. 63 (18), Nov. 1, 1993, pp. 2570-2572.

Kondo, M.., et al., "Epitaxial Ferroelectric Thin Films on Silicon Substrates for Future Electronic Devices," Fujitsu Sci. Tech. Journal, vol. 38 (1), Jun. 2002, pp. 46-53.

Kuffer, O., et al., "Nanoscale ferroelectric field-effect writing and reading using scanning tunnelling spectroscopy," Nature Materials, vol. 4, May 2005, pp. 378-382.

Fujimoto, et al., "High-speed switching of nanoscale ferroelectric domains in congruent single-crystal LiTaO3," Applied Physics Letters, vol. 83, Issue 25, Dec. 22, 2003, Abstract.

Shin, et al., "Construction of Probe-Based Data Storage with Ultra-High Areal Density," IEEE-NANO, Proceedings of the 2001 1$^{st}$ IEEE Conference on Nanotechnology, Oct. 21, 2001, pp. 207-212.

Duan et al., "Simulations of Ferroelectric Polymer Film Polarization: The Role of Dipole Interaction," Physics Review B, vol. 69, Jun. 21, 2004, pp. 235106-1-235106-6.

Morozovska, et al., "The Study of Screening Phenomena Under the Nano-Domain Formation in Ferroelectric Semiconductors," Physica Status Solidi (B). vol. 243, No. 8, May 12, 2006, pp. 1996-2011.

Colla, et al., "Direct Observation of Inversely Polarized Frozen Nanodomains in Fatigued Ferroelectric Memory Capacitors," Applied Physics Letters, vol. 82, No. 10, Mar. 10, 2003, pp. 1605.

International Search Report and Written Opinion, in connection with Application No. PCT/US2008/50610 dated Jul. 2, 2008, 6 pages.

International Search Report and Written Opinion, in connection with Application No. PCT/US2008/061432 dated Aug. 6, 2008, 7 pages.

International Search Report and Written Opinion, in connection with Application No. PCT/US2008/057327 dated Aug. 7, 2008, 6 pages.

International Search Report and Written Opinion, in connection with Application No. PCT/US2008/062901 dated Aug. 8, 2008, 7 pages.

* cited by examiner

METHOD AND MEDIA FOR IMPROVING FERROELECTRIC DOMAIN STABILITY IN AN INFORMATION STORAGE DEVICE

TECHNICAL FIELD

This invention relates to high density information storage devices.

BACKGROUND

Software developers continue to develop steadily more data intensive products, such as ever-more sophisticated, and graphic intensive applications and operating systems. As a result, higher capacity memory, both volatile and non-volatile, has been in persistent demand. Add to this demand the need for capacity for storing data and media files, and the confluence of personal computing and consumer electronics in the form of portable media players (PMPs), personal digital assistants (PDAs), sophisticated mobile phones, and laptop computers, which has placed a premium on compactness and reliability.

Nearly every personal computer and server in use today contains one or more hard disk drives (HDD) for permanently storing frequently accessed data. Every mainframe and supercomputer is connected to hundreds of HDDs. Consumer electronic goods ranging from camcorders to digital data recorders use HDDs. While HDDs store large amounts of data, they consume a great deal of power, require long access times, and require "spin-up" time on power-up. Further, HDD technology based on magnetic recording technology is approaching a physical limitation due to super paramagnetic phenomenon. Data storage devices based on scanning probe microscopy (SPM) techniques have been studied as future ultra-high density (>1 Tbit/in2) systems. Ferroelectric thin films have been proposed as promising recording media by controlling the spontaneous polarization directions corresponding to the data bits. However, uncontrolled switching of the polarization direction of a data bit can undesirably occur in ferroelectric thin films as data bit density increase.

BRIEF DESCRIPTION OF THE DRAWINGS

Further details of the present invention are explained with the help of the attached drawings in which:

FIG. 1.

FIG. 2.

FIG. 3.

DETAILED DESCRIPTION

Ferroelectrics are members of a group of dielectrics that exhibit spontaneous polarization—i.e., polarization in the absence of an electric field. Ferroelectrics are the dielectric analogue of ferromagnetic materials, which may display permanent magnetic behavior. Permanent electric dipoles exist in ferroelectric materials. One common ferroelectric material is lead zirconate titanate ($Pb[Zr_xTi_{1-x}]O_3$ $0<x<1$, also referred to herein as PZT). PZT is a ceramic perovskite material that has a spontaneous polarization which can be reversed in the presence of an electric field.

Figure 1A:
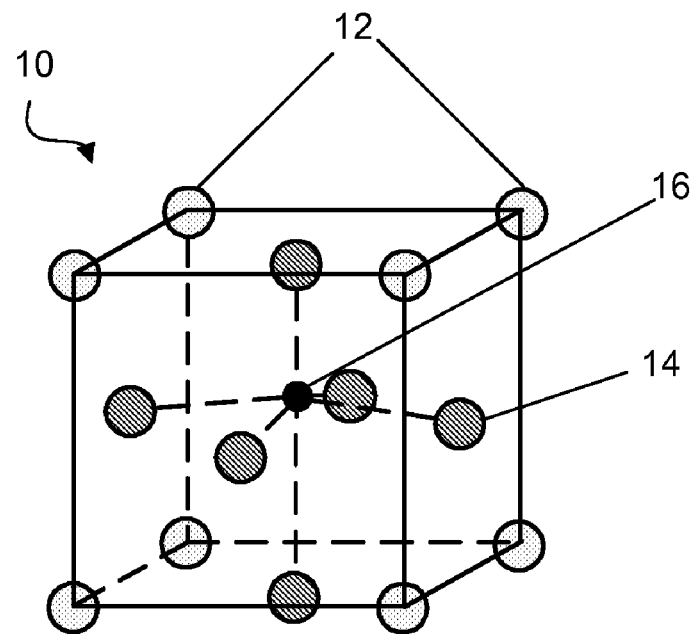
FIG. 1A is a perspective representation of a crystal of a ferroelectric material having a polarization.
Figure 1B:
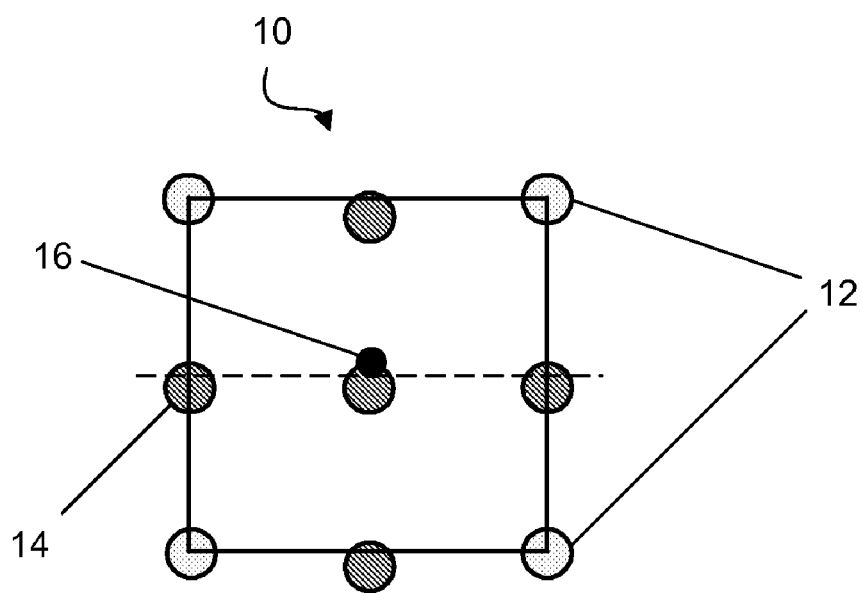
FIG. 1B is a side representation of the crystal of FIG. 1A.

Referring to FIGS. 1A and 1B, a crystal of one of form of PZT, lead titanate ($PbTiO_3$) is shown. The spontaneous polarization is a consequence of the positioning of the $Pb^{2+}$, $Ti^{4+}$, and $O^{2-}$ ions within the unit cell 10. The $Pb^{2+}$ ions 12 are located at the corners of the unit cell 10, which is of tetragonal symmetry (a cube that has been elongated slightly in one direction). The dipole moment results from the relative displacements of the $O^{2-}$ and $Ti^{4+}$ ions 14, 16 from their symmetrical positions. The $O^{2-}$ ions 14 are located near, but slightly below, the centers of each of the six faces, whereas the $Ti^{4+}$ ion 16 is displaced upward from the unit cell 10 center. A permanent ionic dipole moment is associated with the unit cell 10. When lead titanate is heated above its ferroelectric Curie temperature, the unit cell 10 becomes cubic, and the ions assume symmetric positions Ferroelectrics have been proposed as promising recording media, with a bit state corresponding to a spontaneous polarization direction in a ferroelectric film, wherein the spontaneous polarization direction is controllable by way of application of an electric field. Ferroelectric films can achieve ultra high bit recording density because the thickness of a 180° domain wall in ferroelectric material is in the range of a few lattices (1-2 nm). However, it has been recognized that maintaining stability of the spontaneous polarization of the ferroelectric film may or may not be problematic, limiting use of ferroelectrics as recording media in information storage devices.

Figure 2A:
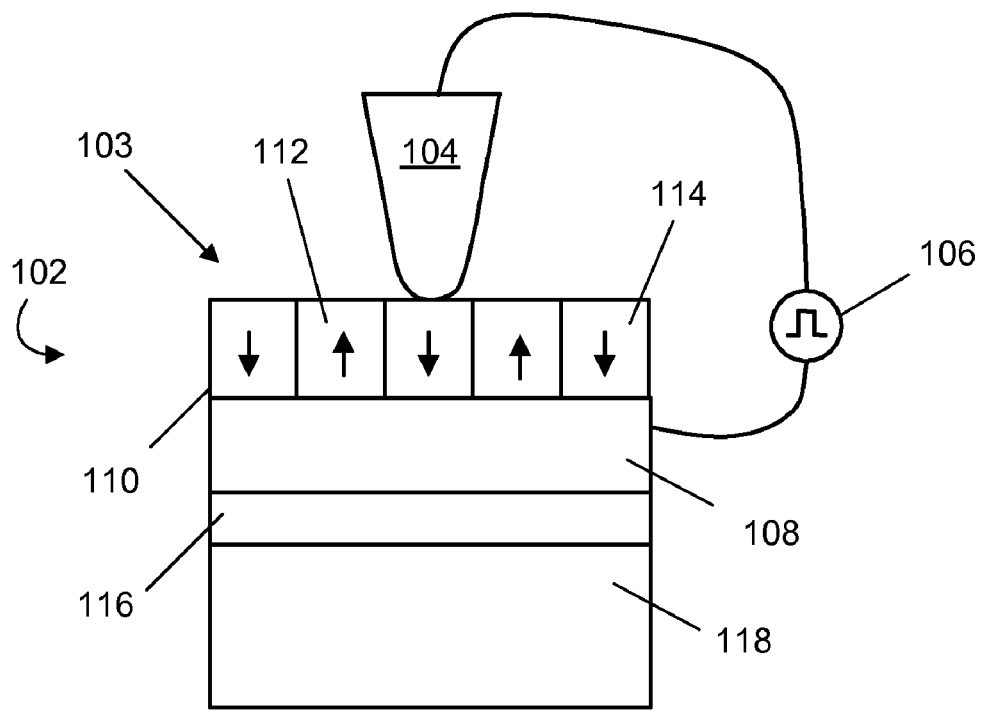
FIG. 2A is a schematic representation of a tip arranged over a ferroelectric media for polarizing a portion of a ferroelectric layer thereby storing information.

Referring to FIG. 2A, a schematic representation of an information storage device is shown including a probe tip 104 (referred to hereafter as a tip) contacting a surface of a media 102 comprising a ferroelectric layer 103. The ferroelectric layer 103 includes domains having dipoles 110, 112 of alternating orientation. The media 102 has an asymmetric electrical structure, with the ferroelectric layer 103 arranged over a conductive bottom electrode 108. The tip 104 acts as a top electrode when contacting the surface of the media 102, forming a circuit including a portion 114 of the ferroelectric layer 103. A current or voltage source 106 can apply a pulse or other waveform to affect a polarization of the portion 114. However, the surface area of the media 102 in contact with the tip 104 relative to the surface area accessible to the tip 104 is very small at any given time; therefore, the media 102 is more accurately approximated as having no top electrode. In addition to affecting the electrical characteristics of the media, the asymmetric structure subjects the ferroelectric layer to film stresses during manufacturing which can affect the ferroelectric properties of the ferroelectric layer. Thus, an asymmetric structure can exacerbate instability of the polarization of domains in the ferroelectric layer.

The media 102 can comprise a film stack of epitaxial single crystal films. Single-crystal silicon (Si) is suitable for use as a substrate 118 to enable integration of the media with structures of the information storage device that are fabricated independently from the media. Integration allows, for example, electronic circuitry fabricated using complementary metal-oxide semiconductor (CMOS) or other processes to be mated with micro-electro-mechanical systems (MEMS) structures such as tips. Alternatively, other materials can be used as a substrate, although preferably the material is a single crystal material. As shown, the media 102 comprises a buffer layer 116 grown on the substrate 118. The buffer layer 116 insulates a bottom electrode layer 108 and a ferroelectric layer 110 from the substrate 118. Strontium titanate (SrTiO$_3$, also referred to herein as STO) can be used as a buffer layer 116. STO has acceptable lattice matching to silicon, and is an acceptable insulator. Alternatively, STO can be selected as a substrate material on which the epitaxial stack is grown. A separately grown buffer layer is superfluous where STO is used as a substrate. The media 102 further comprises a bottom electrode layer 108 grown on the buffer layer 116. Epitaxial strontium ruthenate (SrRuO$_3$, also referred to herein as SRO) can be used as a bottom electrode layer 108. SRO has good lattice matching to STO and is electrically conductive. Close structural and chemical similarity between SRO and ferroelectric materials, such as PZT, can reduce interface electrochemical reactions, charge injection in oxide, and other undesired results, thereby improving retention performance, fatigue resistance, number of operational cycles, and other properties. A ferroelectric layer 110 in which domains of spontaneous polarization are formed is grown over the bottom electrode layer 108. As described above, PZT is a ferroelectric material suitable for forming such domains. PZT has good lattice matching to SRO. In an embodiment, the ferroelectric layer 110 can range in thickness from about 30 nm to about 50 nm, although in other embodiments, the ferroelectric layer 110 can be thinner than 30 nm or thicker than 50 nm. Alternatively, the ferroelectric material can include barium titanate, or some other material.

Figure 2B:
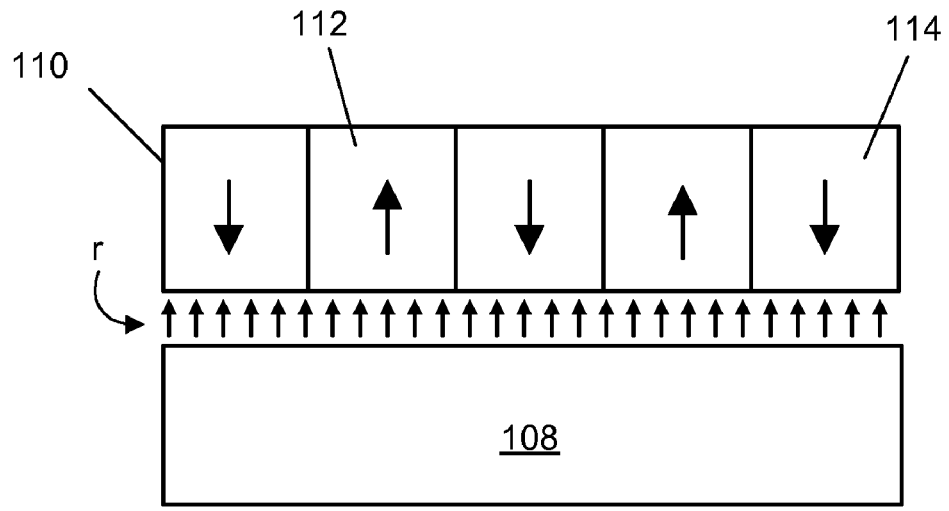
FIG. 2B illustrates electrical dipole charges at an interface of the ferroelectric layer and a bottom electrode.

A substantially uniform crystal lattice structure results across the layers of the ferroelectric media stack; however, at the interfaces between the layers, significant electrical dipole charges occur as a result of the transition from one lattice to another. Such a "dead layer" occurs at the interface of the ferroelectric layer 110 and bottom electrode layer 108 with lattice mismatch, aided by strain relaxation and misfit dislocation weakening ferroelectricity in the interfacial region. Energy band "discontinuity" across the interface is also a source of problem. Inter-diffusion of defects/atoms (such as by motion of oxygen vacancy) across the interface further contributes to forming the dead layer. The dead layer provides sites for "built-in" positive electric charges, developing a permanent net voltage. In response, a permanent net polarization in the upward direction is induced in the ferroelectric layer. The more positive charges in the dead layer, the stronger the background polarization. FIG. 2B illustrates electrical dipole charges at an interface of the ferroelectric layer and a bottom electrode layer. The dipole charges exert an electric field on domains of spontaneous polarization within the ferroelectric layer 110, and can induce a preferred up domain orientation. The effect is significant for epitaxial films because the uniformity of the crystal lattice structure results in a generally uniform electric field across the interface. As shown, the vector from the negative to the positive charge, r$_1$, is oriented from bottom to top. The dipole charges can induce domains within the ferroelectric layer having down orientations to "flip" to have up orientations (such domains can be referred to as "unswitched" domains).

Figure 3A:
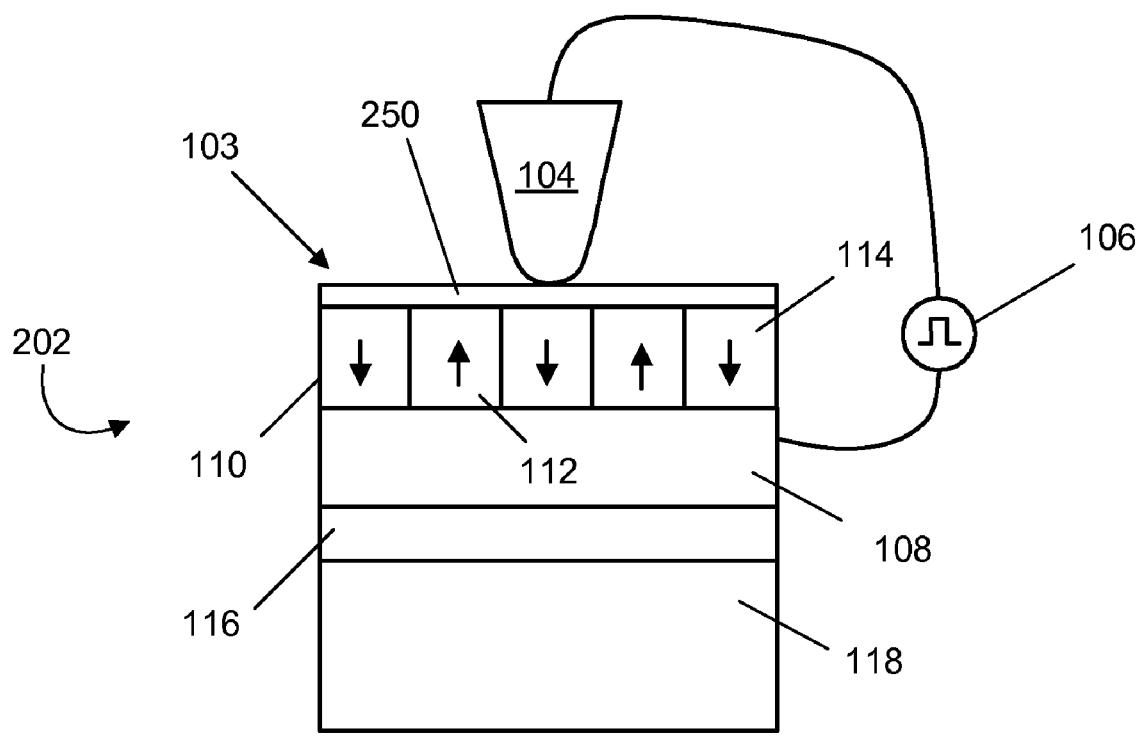
FIG. 3A is a schematic representation of a tip arranged over an embodiment of a ferroelectric media in accordance with the present invention, the tip polarizing a portion of a ferroelectric layer to store information.
Figure 3B:
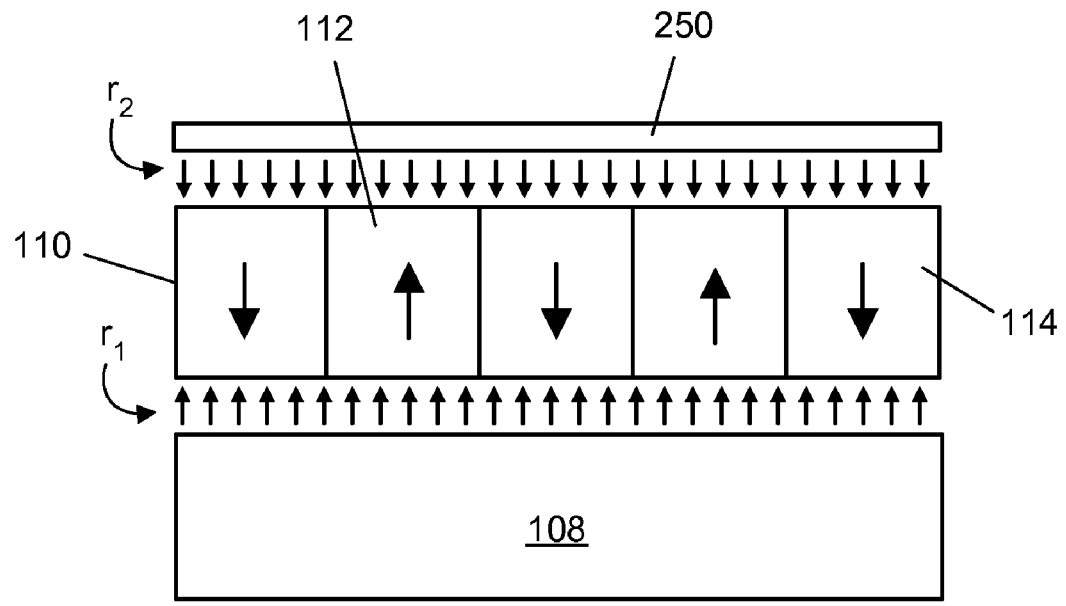
FIG. 3B illustrates electrical dipole charges at an interface of the ferroelectric layer and a bottom electrode, and at an interface of the ferroelectric layer and an over-layer.

Referring to FIG. 3A, a schematic representation of an information storage device is shown including a probe tip 104 (referred to hereafter as a tip) contacting a surface of an embodiment of a media 202 in accordance with the present invention comprising a ferroelectric layer 103. As above, the media 202 comprises a ferroelectric layer 103 including domains having dipoles 110, 112 of alternating orientation. Further, as above, the media 202 can comprise a stack including substrate 118 (e.g., single crystal silicon), a buffer layer 116 formed over the substrate 118 (or alternatively a substrate acting as both the buffer layer and substrate), a bottom electrode layer 108 formed over the buffer layer 116 and isolated from the substrate 118 by the buffer layer 116, and a ferroelectric layer 110 formed over the bottom electrode layer 108. Embodiments of media in accordance with the present invention can further comprise an over-layer 250 formed on the ferroelectric layer 110. The over-layer 250 can include an epitaxially grown film of a material chosen so that an interface between the over-layer 250 and the ferroelectric layer 110 includes electrical dipole charges which exert an electric field that at least partially counter-influences the orientation of the ferroelectric domains to limit or resist uncontrolled switching of the ferroelectric domains caused by the electric field exerted by the dipole charges at the interface between the ferroelectric layer and the bottom electrode. The over-layer 250 can be the same material with which the bottom electrode layer 108 is formed (e.g., SRO). FIG. 3B illustrates electrical dipole charges, r$_1$, at an interface of the ferroelectric layer and a bottom electrode and electrical dipole charges, r$_2$, at an interface of the ferroelectric layer and the over-layer. The electric fields produced by the electric dipoles of the interfaces should have opposite orientations to at least partially counter-balance each other and reduce or remove domain orientation bias. In a symmetric media, both sides of the PZT interfaces develop the dead layers, and the net voltages "cancel" out.

It is possible that if the bottom electrode and ferroelectric layer are near flawlessly fabricated, a dead layer may not occur at an interface of the bottom electrode and ferroelectric layer. However, the asymmetric electrical structure discussed above can produce a slight bias field. In such circumstances, an over-layer having a slight conductivity can reduce asymmetry in the electrical characteristics of the media, thereby reducing the slight bias field. The over-layer can be fabricated with a similar degree of precision as the fabrication of the bottom electrode and the ferroelectric layer to avoid producing a dead layer at the interface between the over-layer and the ferroelectric layer.

The over-layer can be minimally invasive to the process of writing and reading a bit that occurs by means of injecting and extracting a localized electric field. A PZT film that is about 30 to 50 nm thick may hold a good intrinsic energy barrier to depolarization while reasonably satisfying the thickness/radius consideration. The thickness of the bottom electrode layer is not stringent. The over-layer 250 is preferably sufficiently thin so that the over-layer 250 does not unacceptably affect an ability of the tip to read and/or write to the ferroelectric layer. An electric field "signal" strength to write or read a ferroelectric bit weakens as the over-layer thickens (the relationship can be approximated by the equation $E=V/d$). Preferably, the over-layer can induce a region of localized charges (thus, a region of localized electric field/potential distribution) in the over-layer when a voltage drop is present between the tip and the bottom electrode. A semiconductor over-layer can accomplish the voltage drop by charge depletion/inversion. The over-layer can be formed from a doped insulator such as SRO having a thickness of approximately 5 nm or less, or alternatively the over-layer can be formed of a metal having a thickness within a Debye screen length (i.e., less than 1 nm). The over-layer 250 should have a dielectric constant substantially high enough so that a voltage drop from the tip to the bottom electrode is not dominated by the over-layer. Further, an over-layer 250 comprising an insulator can optionally be doped to have a slight conductivity so that a surface charge attributable to ferroelectric domains can be compensated at the interface. The conductivity should be sufficiently low so that conduction of an electric field across the over-layer during writing is not sufficient to undesirably increase a size of the domain in the ferroelectric layer.

Embodiments of media in accordance with the present invention can be used in an information storage device to maintain stability of the spontaneous polarization of the ferroelectric film, thereby reducing corruption of data through unintended unswitching and/or increasing a persistence of data recorded in the media.

Figure 4:
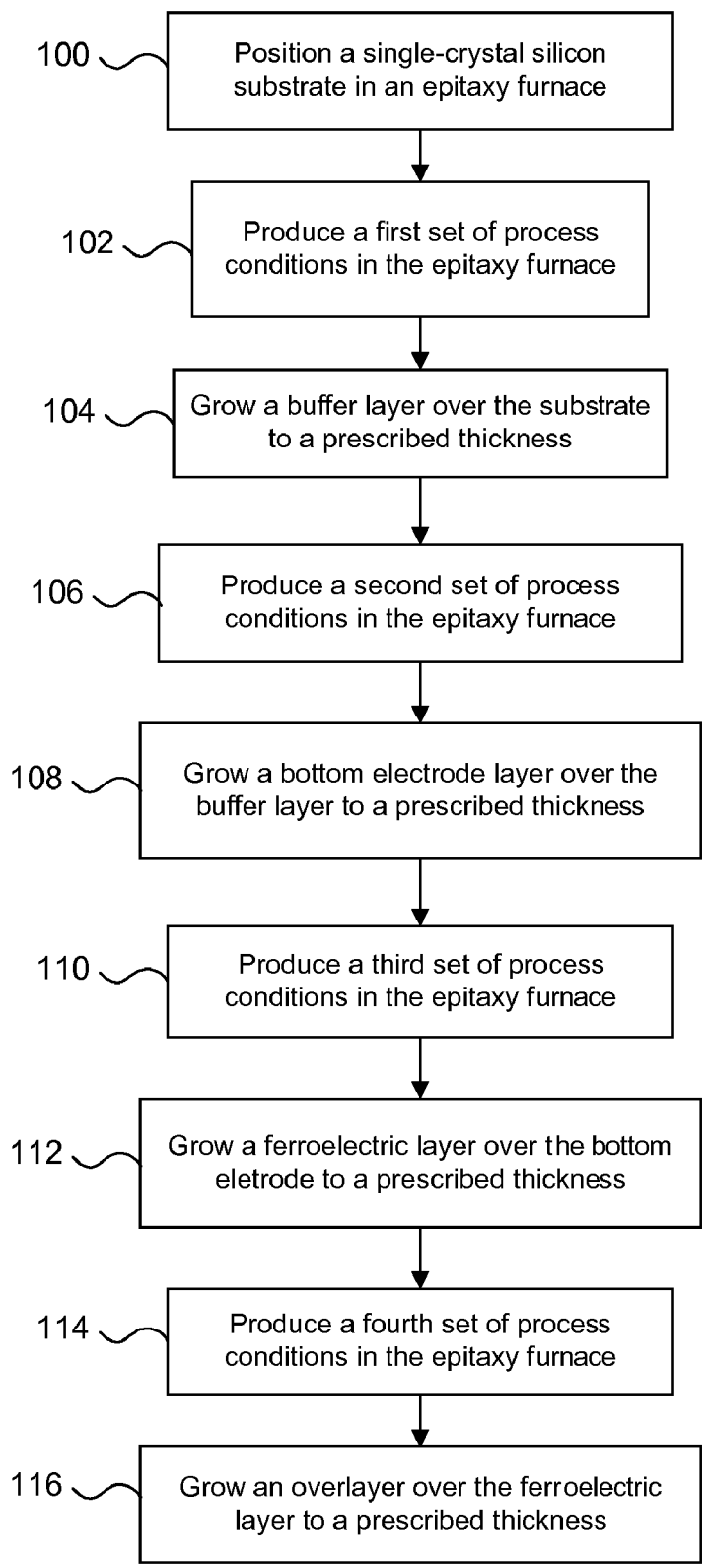
FIG. 4 is a flowchart of an embodiment of a method of fabricating the ferroelectric media of FIG. 3A in accordance with the present invention.

FIG. 4 is a flowchart of an embodiment of a method of fabricating a ferroelectric media including an over-layer formed over the ferroelectric layer in accordance with the present invention. The media can be built on a single-crystal silicon substrate. The silicon substrate, which can be a silicon wafer having a surface suitable for epitaxial growth as is commonly known in the semiconductor arts, is positioned within an epitaxy furnace (Step 100). A first set of process conditions is produced in the epitaxy furnace by increasing a temperature to a prescribed temperature and introducing one or more process gases to the epitaxy furnace to interact with the substrate (Step 102). The epitaxy furnace is maintained at the first set of prescribed conditions until a buffer layer is grown over the substrate to a prescribed thickness (Step 104). Process gases can be evacuated from the epitaxy furnace, and a second set of process conditions is produced in the epitaxy furnace. The second set of process conditions can include adjusting the temperature of the epitaxy furnace, though it need not necessarily require adjusting temperature. The second set of process conditions can further include a second set of process gases introduced to the epitaxy furnace so that the surface of the buffer layer can interact with the process gases (Step 106). The epitaxy furnace is maintained at the second set of prescribed conditions until a bottom conductor layer is grown over the buffer layer to a prescribed thickness (Step 108). The process gases can be evacuated from the epitaxy furnace, and a third set of process conditions is produced in the epitaxy furnace. Again, the third set of process conditions can include (though not necessarily) adjusting the temperature of the epitaxy furnace. The third set of process conditions can further include a third set of process gases introduced to the epitaxy furnace so that the surface of the bottom electrode layer can interact with the process gases (Step 110). The epitaxy furnace is maintained at the second set of prescribed conditions until a ferroelectric layer is grown over the bottom electrode layer to a prescribed thickness (Step 112). The process gases can be evacuated from the epitaxy furnace, and a fourth set of process conditions is produced in the epitaxy furnace. Again, the fourth set of process conditions can include adjusting the temperature of the epitaxy furnace, though it need not necessarily require adjusting temperature. The second set of process conditions can further include a second set of process gases introduced to the epitaxy furnace so that the surface of the ferroelectric layer can interact with the process gases (Step 114). The epitaxy furnace is maintained at the fourth set of prescribed conditions until an over-layer is grown over the ferroelectric layer to a prescribed thickness (Step 116). The process gases can be evacuated from the epitaxy furnace, and the media removed from the furnace.

The foregoing description of the present invention has been presented for purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A media for an information storage device comprising:
   a substrate of single-crystal silicon;
   a buffer layer of an epitaxial single crystal insulator formed over the substrate;
   a bottom electrode layer of an epitaxial single crystal conductor formed over the buffer layer;
   a ferroelectric layer of an epitaxial single crystal ferroelectric material formed over the bottom electrode layer; and
   an over-layer of an epitaxial single crystal material formed over the ferroelectric layer;
   wherein a first set of dipole charges generally having a first orientation exists at an interface between the bottom electrode layer and the ferroelectric layer; and
   wherein a second set of dipole charges generally having a second orientation opposite the first orientation exists at an interface between the ferroelectric layer and the over-layer.

2. The media of claim 1, wherein the ferroelectric layer includes lead-zirconate-titanate.

3. The media of claim 1, wherein the over-layer includes strontium ruthenate.

4. The media of claim 3, wherein the over-layer has a thickness of five nanometers or less.

5. The media of claim 1, wherein the over-layer is a metal.

6. The media of claim 5, wherein the over-layer has a thickness within a Debye screen length of the metal.

7. The media of claim 1, wherein the second set of dipole charges has a magnitude substantially the same as the first set of dipole charges.

8. An information storage device comprising:
   a media, including:
      a bottom electrode layer;
      a ferroelectric layer arranged over the bottom electrode layer; and
      an overlayer arranged over the ferroelectric layer;
      wherein dipole charges generally having a first orientation exist at an interface between the bottom electrode layer and the ferroelectric layer; and
      wherein dipole charges generally having a second orientation opposite the first orientation exist at an interface between the ferroelectric layer and the over-layer; and
   a tip contactable with the over-layer;
   wherein the tip is in electrical communication with the ferroelectric layer through the over-layer.

9. The media of claim 8, wherein the ferroelectric layer includes lead-zirconate-titanate.

10. The media of claim 8, wherein the over-layer includes strontium ruthenate.

11. The media of claim 10, wherein the over-layer has a thickness of five nanometers or less.

12. The media of claim 8, wherein the over-layer is a metal.

13. The media of claim 12, wherein the over-layer has a thickness within a Debye screen length of the metal.

14. The media of claim 8, wherein the second set of dipole charges has a magnitude substantially the same as the first set of dipole charges.

15. A media for an information storage device comprising:
   a first layer of epitaxial film;
   a second layer of epitaxial film formed over the first layer;
   wherein an interface between the first layer and the second layer results in initial artifacts at the interface, the initial artifacts influencing a characteristic of the second layer;
   a third layer of epitaxial film formed over the second layer;
   wherein an interface between the second layer and the third layer results in compensating artifacts at the interface, the compensating artifacts at least partially reducing the influence of the initial artifacts on the characteristic of the second layer; and wherein the third layer of epitaxial film is accessible to a conductive tip and wherein the third layer is sufficiently thin such that the conductive tip electrically communicates with the second layer.

16. A media for an information storage device comprising:

a first layer of epitaxial film;

a second layer of epitaxial film formed over the first layer;

wherein a first set of dipole charges generally having a first orientation exists at an interface between the first layer and the second layer; and a stabilizing layer of epitaxial film formed over the second layer;

wherein a second set of dipole charges generally having a second orientation opposite the first orientation exists at an interface between the stabilizing layer and the second layer; and wherein the stabilizing layer of epitaxial film is accessible to a conductive tip and wherein the stabilizing layer is sufficiently thin such that the conductive tip electrically communicates with the second layer.

* * * * *